United States Patent [19]

Sherif et al.

[11] Patent Number: 5,002,610

[45] Date of Patent: * Mar. 26, 1991

[54] PROCESS FOR MAKING REINFORCED MAGNESIUM PHOSPHATE FAST-SETTING CEMENTS

[75] Inventors: Fawzy G. Sherif, Stony Point; Ruth E. Gallagher, Dobbs Ferry, both of N.Y.

[73] Assignee: Rhone-Poulenc Basic Chemicals Co., Shelton, Conn.

[ * ] Notice: The portion of the term of this patent subsequent to Apr. 2, 2002 has been disclaimed.

[21] Appl. No.: 808,397

[22] Filed: Dec. 12, 1985

[51] Int. Cl.$^5$ .......................... C04B 9/04; C04B 14/38

[52] U.S. Cl. .................................... 106/691; 106/690; 501/111

[58] Field of Search .................... 106/85, 121, 99, 690, 106/691; 501/111, 95, 35

[56] References Cited

U.S. PATENT DOCUMENTS

| | | | |
|---|---|---|---|
| 847,293 | 3/1907 | Norton | 501/108 OR |
| 2,522,548 | 9/1950 | Streicher | 22/188 |
| 3,403,038 | 9/1968 | Abolins et al. | 501/111 OR |
| 3,475,188 | 10/1969 | Woodhouse et al. | 501/111 OR |
| 3,752,684 | 8/1973 | Kiehl et al. | 106/85 OR |
| 3,879,209 | 4/1975 | Limes et al. | 106/85 X |
| 3,960,580 | 6/1976 | Stierli et al. | 106/85 X |
| 4,008,094 | 2/1977 | Bealle et al. | 501/35 X |
| 4,013,478 | 3/1977 | Meyer | 501/35 X |
| 4,084,982 | 4/1978 | Prior et al. | 106/105 OR |
| 4,141,744 | 2/1979 | Prior et al. | 106/105 OR |
| 4,174,227 | 11/1979 | Tomic | 106/85 OR |
| 4,243,421 | 1/1981 | Kame | 501/35 OR |
| 4,303,446 | 12/1981 | LaCourse et al. | 501/35 OR |
| 4,363,878 | 12/1982 | Yamamoto et al. | 106/99 X |
| 4,379,870 | 4/1983 | Matsumoto | 106/99 X |
| 4,417,925 | 11/1983 | Cherry | 106/85 OR |
| 4,487,632 | 12/1984 | Sherif et al. | 106/85 OR |
| 4,504,555 | 3/1985 | Prior et al. | 501/111 X |
| 4,505,752 | 3/1985 | Sherif et al. | 106/85 OR |
| 4,755,227 | 7/1988 | Sherif et al. | 106/85 |

Primary Examiner—Karl Group
Attorney, Agent, or Firm—Paul J. Juettner

[57] ABSTRACT

Improved magnesium phosphate fast-setting cements comprising an effective amount of fiber to increase the impact strength of the cement. These fibers include glass, metal, organic and mixtures thereof.

5 Claims, No Drawings

PROCESS FOR MAKING REINFORCED MAGNESIUM PHOSPHATE FAST-SETTING CEMENTS

BACKGROUND OF THE INVENTION

1. Field of the Invention

This invention relates to fast-setting magnesium phosphate cements. More particularly, it relates to improved fast-setting magnesium phosphate cements containing an effective amount of fiber to increase the impact strength of the resulting concrete.

2. Related Art

Cementitious compositions having a very fast setting time and prepared by mixing a magnesium-containing component with an ammonium phosphate component and an optional aggregate are popular for use in repairing or patching cracks, holes and spalled areas of highways, airfield pavements and bridge decks, as well as for a variety of commercial and industrial applications.

U.S. Pat. No. 3,879,209 (Limes et al., Apr. 22, 1975) discloses a process for making such a fast-setting concrete comprising establishing a mixture of an aggregate, containing at least 10 percent by weight of magnesia, and ammonium phosphates in aqueous solution. This patent discloses that a commercial agricultural fertilizer product known as sequestered phosphatic solution (SPS) is particularly suitable as a source of the ammonium phosphate. This reference is one of many references which disclose a class of magnesium phosphate fast-setting cementitious compositions which when mixed with an aqueous component sets at ambient temperatures in substantially less than one-half hour after mixing. The strength development of these compositions is sufficiently rapid to permit, e.g. automobile traffic thereover, within a few hours following application. Additionally, these compositions exhibit excellent adhesion to various substrates, e.g. Portland cement concrete and steel, and they attain high compressive strength and are quite durable.

U.S. Pat. No. 2,522,548 (Streicher, Sept. 19, 1950) discloses the preparation of phosphate gel binders by reacting metal oxides, e.g. magnesium oxide, and primary phosphate solutions. These binders can contain a filler, e.g. kieselguhr. However, this reference is directed to the use of these phosphate gel binders in a refractory application and further states that the primary ammonium phosphate is not effective in its process.

U.S. Pat. No. 3,475,188 (Woodhouse, Oct. 28, 1969) discloses a refractory composition comprising a liquid bonding agent, for example sequestered phosphatic solution, that is diammonium phosphate and polyphosphate, absorbed onto an absorbent, for example quartzite, and a particulate refractory substance containing MgO. This reference further states that phosphoric acid and magnesia resulted in relatively low strength chemically bonded composition due to their rapid reaction. Again, this reference is directed to refractory compositions and does not disclose the process of the present invention.

U.S. patent application Ser. No. 617,317, filed June 7, 1984, which is a continuation-in-part of U.S. patent application Ser. No. 522,077, filed Aug. 11, 1983 and now abandoned, and EPC patent application 84201155.3, published Mar. 6, 1985, discloses a particularly effective solid phosphorus pentoxide material suitable for use in these fast-setting magnesium phosphate cements. This material is prepared by a process which comprises mixing a porous material with a liquid phosphorus pentoxide material and heating the mixture until a dry solid is produced. This solid phosphorus pentoxide material can then be dry blended with a solid component comprising magnesium oxide, magnesium hydroxide, magnesium carbonate or mixtures thereof. When hydrated, this dry blend has been found particularly advantageous in the fast-setting magnesium phosphate cement applications described above. This reference discloses that an aggregate including fibers can be added to the cement to enhance its strength, however the significant impact strength increase disclosed by this invention was not anticipated.

U.S. Pat. No. 3,960,580 (Stierli et al., June 1, 1976) discloses magnesium phosphate concretes containing specified oxy-boron compounds such as sodium borate as set retarders. The phosphate component of the cementitious compositions disclosed by Stierli et al. appears to contemplate either a dry solid monoammonium phosphate component, or a solid monoammonium phosphate component comprising a mixture of monoammonium phosphate and another solid phosphate selected from diammonium phosphate and sodium pyrophosphate. A solid activator component comprising a $P_2O_5$ material absorbed onto a porous material is not contemplated or disclosed.

U.S. Pat. No. 3,752,684 (Kiehl et al., Aug. 14, 1973) discloses an insulating refractory material containing magnesium phosphate, alkaline earth oxides, silica and mineral fibers. The fibers are typically mineral wool or asbestos fibers. This reference does not disclose the improved fast-setting magnesium phosphate cements containing fiber as disclosed in this invention.

U.S. Pat. No. 4,417,925 (Cherry, Nov. 29, 1983) discloses a ceramic fiber refractory mixture. This mixture typically contains ceramic fiber, aluminum phosphate powder, calcine magnesia, water soluble binder, organic polymer plasticizing agent and an acidifying agent. The preferred ceramic fibers are selected from the group consisting of aluminum fibers, aluminum silicate fibers, chrome-containing fibers and mixtures thereof with fibers of aluminum silicate being the most preferred of the group. Again, this reference does not disclose the improved fast-setting magnesium phosphate cements containing fiber of this invention.

U.S. Pat. No. 84,293 (Norton, Mar. 12, 1907) discloses the preparation of refractory materials by combining asbestos fiber and magnesium oxide with water under pressure. This reference does not disclose the improved fast-setting magnesium phosphate cements containing fiber of this invention.

SUMMARY OF THE INVENTION

An object of this invention is to provide a process for preparing improved magnesium phosphate cements having increased impact strength.

Other objects and advantages of the present invention are described elsewhere within this specification.

In accordance with the present invention, a process for preparing an improved fast-setting magnesium phosphate cement has now been discovered comprising adding an effective amount of fiber to increase the impact strength of the cement. In this process the fiber is selected from the group consisting of glass, metal, organic and mixtures thereof. The cement of this process can be prepared by mixing a solid activator comprising a $P_2O_5$ material absorbed onto a porous material with a magnesium-containing component and an effective amount of fiber to increase the impact strength of the cement. The solid activator can be prepared by mixing a porous material with a liquid $P_2O_5$ material to form a semi-solid, drying the semi-solid, and milling the dried semi-solid. In this process an aggregate can further be added.

DETAILED DESCRIPTION OF THE INVENTION

The process of this invention generally comprises adding to a fast-setting magnesium phosphate cement an amount of fiber effective to increase the impact strength of the resulting cement. The magnesium phosphate cement useful in this invention can be prepared by bringing together a magnesium-containing component and a $P_2O_5$ material wherein said component and said material are capable of setting to a hardened mass at ambient temperatures following the addition of water thereto.

In a preferred form of this invention the magnesium phosphate cement generally comprises a solid activator and a magnesium-containing component. The solid activator component is a composite comprising a $P_2O_5$ material absorbed onto a porous material. This activator can be prepared by mixing a porous material with a liquid phosphorus pentoxide material then heating the mixture until a dry solid is produced. The dry solid is then milled.

The term "$P_2O_5$ material" is used throughout this specification to describe materials containing phosphorus values.

The phosphorus content of these materials is usually analyzed and expressed as $P_2O_5$, hence the term "$P_2O_5$ material".

The liquid phosphorus pentoxide material can be any material containing free or available $P_2O_5$ such as green acid. This material can be selected from various industrial and agricultural chemicals and wastes. Some examples of suitable $P_2O_5$ materials include aluminum phosphate solution; ammonium phosphate solution; calcium phosphate solution; bright dip phosphoric acid from metal polishing processes; phosphoric acid; waste phosphoric acid from agricultural chemical processes; steel phosphatizing sludge acid resulting from the pickling of steel to inhibit corrosion; arsenic sulfide sludge acid resulting from the treatment of $P_2O_5$ waste streams with $H_2S$ to remove arsenic; and any combination of the above liquids.

The liquid $P_2O_5$ material can further include various acidic phosphorus compounds, e.g., orthophosphoric acid, pyrophosphoric acids and other polyphosphoric acids and their salts.

A preferred liquid $P_2O_5$ material is ammonium phosphate fertilizer solution. This fertilizer solution contains a mixture of ortho- and polyphosphates and in its original aqueous state undergoes continuous hydrolysis while standing whereby the weight ratios of the different phosphate forms keep changing, usually from high polyphosphate and low orthophosphate contents to low polyphosphate and high orthophosphate contents as the fertilizer ages. The polyphosphates of this fertilizer solution can include pyro-, tri-, tetra-, etc., phosphate species. Because of this continuous hydrolysis, magnesium phosphate cements using liquid ammonium phosphate fertilizer by itself as the $P_2O_5$ component exhibit unpredictable qualities. Usually, when a fresh fertilizer solution is used, the cement mixture does not set at all or only forms a weak cement, and when an older fertilizer solution is used, the cement sets very rapidly with little or no working time to apply the cement. Liquid fertilizer solution upon standing precipitates hard to handle insolubles, and in cold weather the liquid freezes and gels creating more handling problems.

A particularly preferred fertilizer solution is Poly-N$^{(R)}$ 10-34-0 ammonium polyphosphate solution supplied by Arcadian Company and used primarily as an agricultural fertilzer. A typical analysis of the Poly-N$^{(R)}$ brand fertilizer shows 10.0 weight percent ammoniacal nitrogen and 34 weight percent total $P_2O_5$. Sixty percent of the total $P_2O_5$ is polyphosphate. The commercial product contains approximately 2 weight percent of impurities, which do not adversely affect its use in preparing the solid activator. The major impurities comprise approximately 0.5 weight percent iron, 0.5 weight percent sulfur, 0.2 weight percent magnesium (as MgO) and 0.15 weight percent of fluorine. This commercial product also contains approximately 50 weight percent water.

When the fertilizer solution is absorbed onto the porous material of this invention, the fertilizer is held in a bound form and this composition is much more thermally stable in a temperature range of from ambient to about 120° C., than the original fertilizer solution. The resulting dry solid maintains a constant phosphate distribution between the ortho- and polyphosphate species and does not hydrolyze as the original fertilizer solution would.

The porous material which can be employed in this invention includes diatomaceous earth, kieselguhr, artificially prepared porous silica, vermiculite, alumina, and such naturally occurring substances as various fuller's earth and clays such as bentonite, montmorillonite, acid treated clays and the like. Each porous material which may be used will exert its own specific influence upon the solid activator formed and the resulting fast-setting cement which will not necessarily be identical with that of other members of the class. The porous material can be inert or particially inert. Members of the class of porous material can be used separately or in combination with each other.

A preferred porous material is diatomaceous earth. The highly porous diatomaceous earth can absorb much more than 80 percent by weight, based on the weight of diatomaceous earth, of a phosphate-containing liquid, e.g. liquid ammonium phosphate fertilizer solution, and absorption of 225 percent and above are preferred. Upon drying the diatomaceous earth with the phosphate-containing liquid absorbed therein, the solid $P_2O_5$ activator forms.

The diatomaceous earth can comprise from about 30 percent to about 90 percent by weight of the solid activator with about 30 percent to about 65 percent being preferred; can have a density of from 7.0 to 19.5 pounds/cubic foot (0.112 to 0.312 gms/cc); can have a water absorption value of from 170 percent to 255 percent by weight; and can have a surface area of from 1 to 100M$^2$/g. It is believed that when diatomaceous earth is mixed with liquid ammonium phosphate fertilizer and heated to form the dry solid activator, more than a physical entrapment of the $P_2O_5$ material occurs.

The liquid $P_2O_5$ material is mixed with the porous material at ambient temperature to form a semi-solid, slurry or paste. The amount of liquid $P_2O_5$ material added is important. Amounts up to that which will fill the pores of the porous material can be used with one drying step. Amounts exceeding the pore volume of the porous material can be absorbed with several drying steps. The semi-solid, slurry or paste is heated to a temperature of from about 60° C. to about 200° C. to drive off moisture and other volatile impurities until a dry solid is produced.

The rate of heating is adjusted so that, upon drying, the pores of the porous material are not blocked with the $P_2O_5$ material, but remain available to the aqueous component when the cement is made. Sufficient porous material should be used to have enough pore volume available to absorb a suitable amount of the $P_2O_5$ material. Upon drying, most of the aqueous component will be driven off, leaving solid $P_2O_5$ material deposited inside and over the walls of the microscopic pores.

The starting materials, i.e. the liquid $P_2O_5$ material, and the porous material are mixed in the proportions necessary to form a dry solid comprising from about 10 percent to about 70 percent by weight of the $P_2O_5$ material and from about 30 percent to about 90 percent by weight of the porous material in the resulting solid activator.

The solid activator prepared as described above is dry blended with a magnesium-containing component and an amount of fiber to yield a dry cementitious composition capable of setting to a hardened mass at ambient temperatures when reacted with an aqueous component. The solid activator can optionally be milled and classified prior to being dry blended with the other components of the cementitious composition. The activator typically has a particle size range of from 100 to 325 mesh and a surface area of from 0.1 to 10 $M^2/g$.

The solid activator can range from about 6 weight percent to about 90 weight percent of the cementitious composition, with a range from about 10 weight percent to about 25 weight percent being preferred.

The magnesium-containing component can be any material capable of releasing magnesium ions making said ions available to react to form a magnesium phosphate. Preferred magnesium-containing compounds are magnesium oxide, magnesium hydroxide and magnesium carbonate. These compounds must be capable of being dry blended with the solid activator without reacting therewith. However, in the presence of an aqueous component the dry blend will react to form a monolithic solid. Mixtures of these magnesium compounds can also be employed.

A preferred magnesium-containing component is MgO. This MgO can be of low reactivity, of high reactivity or a mixture of low and high reactivity wherein the ratio of the constituents of the mixture is selected to achieve the working time and cement strength desired. This preferred magnesium-containing component can usually be from about 4 percent to about 50 percent by weight of the overall composition, with from about 5 to about 15 percent by weight being preferred.

The fiber useful in this invention is selected from the group consisting of glass, metal, organic fibers and mixtures thereof. An effective amount of fiber is added to increase the impact strength of the cement. The amount of fiber used can range from about 0.25 to about 5.0 weight percent of the cement. The length of the individual fibers used can be uniform or can vary. Ground fibers can also be used. These fibers can be uniformly distributed in the cement material. On the other hand, they can be placed in high concentration in shaped pieces in places which are particularly exposed to the action of mechanical force. The fibers can also be added in the form of fiber fleeces, yarns, cords, gauzes, woven materials, etc. The cross section of the fibers can take a variety of forms, especially resulting from physical and chemical variations in preparation processes. A particularly preferred type of fiber is a glass fiber.

When the fiber is included in the process and composition of this invention, the overall strength of the resulting cement can be increased. However, the effect on compressive strength depends on other variables within the particular quick-setting magnesium phosphate cement. Usually, the addition of fibers reduces the flowability of the cement because of water absorption by the fibers. This effect on flowability appears to be related to the sizing treatment of the multifilament rather than the fiber length or diameter. Additional water and/or flow enhancers can be added to maintain the flowability at levels experienced when no fibers are used. Impact strength is a measure of the resistance of the concrete to breakage by a sudden blow and this impact strength is increased when the quick-setting magnesium phosphate cement is reinforced with fibers.

Generally, the fast-setting cementitious compositions resulting from the process of this invention can be used for producing fast-setting concrete structures, e.g., structures suitable for roadway construction and roadway patches or other load-bearing uses. However, in its broader aspects, the invention is generally applicable to preparing concrete structures with various characteristics, e.g., high or low strength, for a variety of other purposes as well. The characteristics of any particular concrete structures formed can depend upon the weight ratio of the various components, the nature of the aggregate employed, the temperature conditions of application and the curing conditions as well as other factors.

Fast-setting cement can be applied indoors or outdoors to concrete drives, storage yards, warehouse and factory floors to repair and restore damaged surfaces. Fast-setting cement can be used to fill structural cracks in slabs, and repair highway median barrier walls. This type of cement can be used in almost any situation requiring a quick, permanent repair of concrete. In addition, the fast-setting cement can be used for binding and coating metals and woods for structural and flame resistant applications.

A particulate aggregate, preferably graded sand, can be included in the dry blend in a controlled amount as a filler. Aggregate can greatly enhance the strength of the hardened concrete cement. Aggregate usage can range from 0 percent to 90 percent by weight of the dry mix containing aggregate with a range of from about 40 percent to about 80 percent by weight of the dry mix plus aggregate being preferred. Other aggregate materials which can be used include particles of competent rocks or rock-forming minerals such as granite, basalt, dolomite, andesite, feldspar, amphibole, pyroxene, olivine, gabbro, rhyolite, syenite, diorite, dolerite, peridotite, trachyte, obsidian, quartz, etc., as well as materials such as slag, cinders, fly ash, glass cullet, wood chips, and fibrous materials such as chopped metal wire (preferably steel), glass fibers, asbestos, cotton, and polyester and aramide fibers. Aggregates having different particle shapes and size can be used. Mixtures of different aggregates can also be used. The porous material used to absorb the liquid $P_2O_5$ material will further function as an aggregate.

The combination of activator, magnesium-containing component and fiber can be a dry stable blend when no water is present. When this blend is contacted with an aqueous component, preferably water, then a reaction occurs forming a fast-setting cement. The amount of aqueous component used is important. Too much water can convert the dry blend into a thin slurry that will not set until substantial dehydration occurs; and, too little water will not wet the dry blend sufficiently to allow the necessary chemical reaction. The optimum amount of water will depend upon the particular physical characteristics of the constituents of the dry blend, e.g., absorbency, surface area, etc. However, the optimum amount of water must be sufficient to adequately wet the dry blend and optional aggregate mixture to form a thick slurry or non-collapsible putty. This optimum amount of water can be determined on a blend by blend basis. The optimum amount of water can also depend upon the weight of the fiber, the weight of the aggregate, and the temperature at which the cement is hydrated. The amount of water used can range from about 5 weight percent to about 15 weight percent of the overall composition with from about 8 to about 12 weight percent being preferred.

Generally, the setting time for fast-setting magnesium phosphate cements varies widely and can range from a few seconds up to a few hours. As a practical matter, the setting time should be sufficient to allow the dry blend to be thoroughly mixed with the aqueous component to form a slurry or a non-collapsible putty and be applied to the intended area, whether a mold or a patch, prior to hardening into a monolithic solid. In quantitative terms, fast-setting usually means that the cement hardens in less than 30 minutes, usually in about 1 to 15 minutes, and reaches more than 1,500 psi compressive strength in usually less than 2 hours.

In a particular embodiment of the process for preparing improved fast-setting magnesium phosphate cementitious composition of this invention, the solid activator is prepared by mixing diatomaceous earth with liquid ammonium phosphate fertilizer to form a semi-solid, drying the semi-solid and milling the dried semi-solid; the magnesium-containing component is a mixture of active and dead burned magnesium oxide; the fiber is glass; and the aggregate is graded silica. The resulting cement will exhibit increased impact strength when compared to cements not using fibers.

The following experiments describe embodiments of the invention. Other embodiments will be apparent to one of ordinary skill in the art from a consideration of this specification or practice of the invention disclosed therein. It is intended that the specification and experiments be considered as exemplary only, with the true scope and spirit of the invention being indicated by the claims which follow the experiments.

EXPERIMENTS

Several fast-setting magnesium phosphate cements were made to test the effect of the addition of fibers. A fast-setting cement with compressive strength of 4700 psi after two hours when reinforced with 2.4% steel fibers gave 4900 psi after two hours and when reinforced with 4.7% steel fibers gave 5100 psi after two hours. A fast-setting cement with compressive strength of 2200 psi after two hours when reinforced with 1.8% Owens-Corning Glass Fibers type 832 gave 4800 psi after two hours.

Table I below summarizes the results obtained from Falling Ball Impact testing on 9 inch concrete plates. In this series of tests the dropping height is held constant and the size of the ball is changed. The average number of hits of a particular ball required to break a concrete plate is indicative of the relative impact strength of that plate.

The concrete plates tested were made from quick-setting magnesium phosphate cement containing 75 weight percent aggregate and 25 weight percent binder which is a combination of activator and MgO. 0.2 weight percent of diammonium phosphate was added as a flow enhancer.

TABLE I

FALLING BALL IMPACT TEST

| Run No. | Fiber Wt. % | Ball Wt. gms. | Impact Strength Nos. Hits to Break |
|---|---|---|---|
| 1 | 0 | 897 | 1 |
|   | 0 | 226 | 2 |
|   | 0 | 160 | 3 |
| 2[1] | 0.5 | 397 | 4 |
|   | 0.5 | 226 | 6.5 |
|   | 0.5 | 160 | 13.5 |
| 3[2] | 0.5 | 397 | 4 |
|   | 0.5 | 226 | 8.5 |
|   | 0.5 | 160 | 14.8 |
| 4[1] | 0.25 | 226 | 5.0 |
|   | 0.25 | 160 | 9.3 |
| 5[1] | 0.125 | 226 | 3.6 |
|   | 0.125 | 160 | 6 |
| 6[1] | 1.0 | 397 | 3 |
|   | 1.0 | 226 | >5[3] |
| 7[1] | 1.5 | 397 | 6.4 |
|   | 1.5 | 226 | >5[3] |

[1] The fiber additive used was ⅛ inch chopped glass fibers type 491AA supplied by Owens Corning.
[2] The fiber additive used was ⅛ inch chopped glass fibers type 832BB supplied by Owens Corning.
[3] The cement plate did not break after 5 hits.

The results in Table I above indicate that even at very low levels of added glass fibers (Runs 4 and 5) a significant increase in impact strength relative to the control is obtained. The degree of improvement in impact strength appears to be proportional to the amount of added glass fibers and it is noted that at the higher usage levels (Runs 2, 3, 6 and 7) the impact strength is greater than the control by several orders of magnitude.

Table II below summarizes the effect of fibers on compressive strength. The compressive strength of concrete made from quick-setting magnesium phosphate cement containing 75 weight percent aggregate and 25 weight percent binder, which is a combination of activator and MgO, was measured.

TABLE II

EFFECT OF FIBERS ON COMPRESSIVE STRENGTH

| Run No. | Fiber Wt. % | Water Wt. % | Compressive Strength, psi After | | |
|---|---|---|---|---|---|
|   |   |   | 2 Hrs. | 8 Hrs. | 7 days |
| 1[1] | 0 | 11.0 | 2900 | — | 4400 |
| 2[2] | 1.0 | 11.7 | 2500 | — | 3400 |
| 3[2] | 1.5 | 12.7 | 1800 | — | 3000 |
| 4[3] | 0 | 11.7 | — | 2200 | 5600 |
| 5[4] | 1.65 | 11.7 | — | 4800 | 5900 |
| 6[5] | 0 | 10.0 | 4700 | — | — |
| 7[6] | 2.5 | 10.0 | 4900 | — | — |
| 8[6] | 5.0 | 10.0 | 5100 | — | — |

[1] Run No. 1 is the control for Run Nos. 2 and 3.
[2] The fiber additive used was ⅛ inch chopped glass fiber type 491AA supplied by Owens Corning.
[3] Run No. 4 is the control for Run No. 5.
[4] The fiber additive used was ⅛ inch chopped glass fibers type 832BB supplied by Owens Corning.
[5] Run No. 6 is the control for Run Nos. 7 and 8.
[6] The fiber additive used was 1 inch Flexten ® brand of deformed steel fibers supplied by Ribbon Technology Corp. of Ohio.

The results in Table II above indicate that when water is added to increase the flow of the fiber-containing cementitious slurry, the compressive strength of the resulting concrete is decreased relative to its control (Runs 1–3). However, when the water level is held constant, the compressive strength of the resulting fiber-containing concrete is increased relative to its control (Runs 4–8).

What is claimed is:

1. A process for preparing an improved fast-setting cement comprising
   (i) mixing a porous material with a liquid $P_2O_5$ material to form a semi-solid;
   (ii) drying the semi-solid; and
   (iii) milling the dried semi-solid
to form a solid activator; mixing the solid activator with a magnesium containing component selected from the group consisting of magnesium oxide, hydroxide, carbonate and mixtures thereof, from about 0.25 to about 5.0 weight percent of the cement of a fiber, said amount of fiber being effective to increase the impact strength of the cement and aggregate in an amount of at least about 40 percent by weight of the dry mix, said aggregate being selected from the group consisting of silica, granite, basalt, dolomite, andesite, feldspar, amphibole, pyroxene, olivine, gabbro, rhyolite, syenite, diorite, doleriate, peridolite, trachyte, obsidian, quartz, slag, cinders, flyash, glass cullet, wood chips and mixtures thereof.

2. The process of claim 1 wherein the porous material is diatomaceous earth and the $P_2O_5$ material is liquid ammonium phosphate fertilizer.

3. The process of claim 2 wherein the magnesium-containing component is magnesium oxide, the fiber is glass and the aggregate is silica.

4. The process of claim 1 wherein the fiber is glass.

5. The process of claim 1 wherein the fiber is selected from the group consisting of glass, metal, organic and mixtures thereof.

* * * * *